(12) United States Patent
Turner

(10) Patent No.: US 10,495,103 B2
(45) Date of Patent: Dec. 3, 2019

(54) FAN BLADE HAVING A TIP ASSEMBLY

(71) Applicant: United Technologies Corporation, Farmington, CT (US)

(72) Inventor: Matthew A. Turner, Wallingford, CT (US)

(73) Assignee: UNITED TECHNOLOGIES CORPORATION, Farmington, CT (US)

( * ) Notice: Subject to any disclaimer, the term of this patent is extended or adjusted under 35 U.S.C. 154(b) by 170 days.

(21) Appl. No.: 15/372,885

(22) Filed: Dec. 8, 2016

(65) Prior Publication Data
US 2018/0163743 A1 Jun. 14, 2018

(51) Int. Cl.
| | |
|---|---|
| *F01D 5/20* | (2006.01) |
| *F04D 29/38* | (2006.01) |
| *F01D 5/14* | (2006.01) |
| *F01D 11/12* | (2006.01) |
| *F04D 29/32* | (2006.01) |
| *F04D 29/52* | (2006.01) |
| *F02K 3/06* | (2006.01) |

(52) U.S. Cl.
CPC ........... *F04D 29/388* (2013.01); *F01D 5/147* (2013.01); *F01D 5/20* (2013.01); *F01D 11/122* (2013.01); *F04D 29/325* (2013.01); *F04D 29/526* (2013.01); *F02K 3/06* (2013.01); *F05D 2220/36* (2013.01); *F05D 2230/23* (2013.01); *F05D 2240/307* (2013.01)

(58) Field of Classification Search
CPC ........ F04D 29/388; F01D 5/20; F01D 11/122; F05D 2220/36; F05D 2240/307
See application file for complete search history.

(56) References Cited

U.S. PATENT DOCUMENTS

| | | | | |
|---|---|---|---|---|
| 2,840,343 A | * | 6/1958 | Brandt, Jr. ............ | F01D 11/122 277/415 |
| 4,227,703 A | * | 10/1980 | Stalker ...................... | F01D 5/20 277/415 |
| 4,390,320 A | * | 6/1983 | Eiswerth ................. | F01D 5/005 29/889.1 |
| 4,526,226 A | * | 7/1985 | Hsia ........................ | F01D 5/187 165/109.1 |

(Continued)

FOREIGN PATENT DOCUMENTS

| | | |
|---|---|---|
| EP | 2963244 A1 | 1/2016 |
| WO | 2015015207 A1 | 2/2015 |

OTHER PUBLICATIONS

European Search Report for EP Application No. 1726242.4 dated May 2, 2018; 7 pages.

*Primary Examiner* — Nathaniel E Wiehe
*Assistant Examiner* — Andrew J Marien
(74) *Attorney, Agent, or Firm* — Cantor Colburn LLP

(57) ABSTRACT

A fan blade includes a tip assembly that is disposed on a blade body. The tip assembly has a leading edge wall disposed proximate a leading edge of the blade body, a trailing edge wall disposed proximate a trailing edge of the blade body, a suction side wall that extends between the leading edge wall and the trailing edge wall, a pressure side wall disposed opposite the suction side wall and extends between the leading edge wall and the trailing edge wall, and a tip wall that extends between the leading edge wall, the trailing edge wall, the suction side wall, and the pressure side wall and is disposed parallel to the tip.

20 Claims, 2 Drawing Sheets

(56) References Cited

U.S. PATENT DOCUMENTS

| | | | | |
|---|---|---|---|---|
| 4,802,828 | A * | 2/1989 | Rutz | F01D 5/20 |
| | | | | 29/889.71 |
| 4,808,055 | A * | 2/1989 | Wertz | B23P 6/007 |
| | | | | 29/402.16 |
| 7,704,039 | B1 * | 4/2010 | Liang | F01D 9/04 |
| | | | | 415/116 |
| 9,216,491 | B2 * | 12/2015 | Bunker | B24C 1/045 |
| 9,856,739 | B2 * | 1/2018 | Bedrosyan | F01D 5/20 |
| 9,879,544 | B2 * | 1/2018 | Waldman | F01D 5/20 |
| 9,879,601 | B2 * | 1/2018 | Vandervaart | F01D 5/182 |
| 10,006,367 | B2 * | 6/2018 | Romanov | F02C 7/18 |
| 2007/0134096 | A1 * | 6/2007 | Mons | B23K 26/147 |
| | | | | 416/97 R |
| 2010/0296939 | A1 * | 11/2010 | Jevons | F01D 5/20 |
| | | | | 416/224 |
| 2011/0002776 | A1 * | 1/2011 | Bottome | F01D 11/22 |
| | | | | 415/173.3 |
| 2013/0195633 | A1 | 8/2013 | Hildebrand et al. | |
| 2013/0255278 | A1 * | 10/2013 | Razzell | F02C 7/12 |
| | | | | 60/806 |

* cited by examiner

FAN BLADE HAVING A TIP ASSEMBLY

BACKGROUND

A gas turbine engine generally includes a fan that is disposed at a forward section of the gas turbine engine. A case assembly or nacelle is disposed about the fan section of the gas turbine engine. The fan may include a plurality of blades that are disposed close to an inner surface of the nacelle. A portion of the blade may contact a rub strip that is disposed on an inner surface of the nacelle during operation. The rub strip is manufactured of material that may be smoothly worn away by the blade to maintain a tight seal between the nacelle and the blade.

BRIEF DESCRIPTION

According to an embodiment of the present disclosure, a fan blade for a gas turbine engine is provided. The fan blade includes a blade body and a tip assembly. The blade body has a pressure side disposed opposite a suction side, each of the pressure side and the suction side extending radially from a root towards a tip and extending axially from a leading edge towards a trailing edge. The tip assembly is disposed on the tip. The tip assembly has a leading edge wall that is disposed proximate the leading edge, a trailing edge wall disposed proximate the trailing edge, and a tip wall extending between the leading edge wall and the trailing edge and disposed parallel to the tip.

In addition to one or more of the features described above, or as an alternative to any of the foregoing embodiments, the leading edge wall extends radially between a leading edge wall first end that engages the leading edge and a leading edge wall second end that is spaced apart from the leading edge.

In addition to one or more of the features described above, or as an alternative to any of the foregoing embodiments, the trailing edge wall extends radially between a trailing edge wall first end that engages the trailing edge and a trailing edge wall second end that is spaced apart from the trailing edge.

In addition to one or more of the features described above, or as an alternative to any of the foregoing embodiments, the leading edge wall second end, the trailing edge wall second end, and the tip wall at least partially define a pocket.

In addition to one or more of the features described above, or as an alternative to any of the foregoing embodiments, the tip wall has a first portion that is operatively connected to the leading edge wall and a second portion that is operatively connected to the trailing edge wall.

In addition to one or more of the features described above, or as an alternative to any of the foregoing embodiments, the first portion is disposed between and is spaced apart from the leading edge wall first end and the leading edge wall second end.

In addition to one or more of the features described above, or as an alternative to any of the foregoing embodiments, the second portion is disposed between the trailing edge wall first end and the trailing edge wall second end.

In addition to one or more of the features described above, or as an alternative to any of the foregoing embodiments, the tip assembly is bonded to the tip of the blade body.

According to another embodiment of the present disclosure, a fan blade is provided. The fan blade includes a tip assembly that is disposed on a blade body. The tip assembly has a leading edge wall disposed proximate a leading edge of the blade body, a trailing edge wall disposed proximate a trailing edge of the blade body, a suction side wall that extends between the leading edge wall and the trailing edge wall, a pressure side wall disposed opposite the suction side wall and extends between the leading edge wall and the trailing edge wall, and a tip wall that extends between the leading edge wall, the trailing edge wall, the suction side wall, and the pressure side wall and is disposed parallel to the tip.

In addition to one or more of the features described above, or as an alternative to any of the foregoing embodiments, the tip wall includes a first face and a second face disposed opposite the first face.

In addition to one or more of the features described above, or as an alternative to any of the foregoing embodiments, the tip wall defines a plurality of holes that extend from the first face to the second face.

In addition to one or more of the features described above, or as an alternative to any of the foregoing embodiments, the first face engages a tip of the blade body.

In addition to one or more of the features described above, or as an alternative to any of the foregoing embodiments, the tip wall is bonded to a tip of the blade body.

In addition to one or more of the features described above, or as an alternative to any of the foregoing embodiments, the first face of the tip wall and first ends of the leading edge wall, the trailing edge wall, the pressure side wall, and the suction side wall define a receiving region that receives the tip of the blade body.

In addition to one or more of the features described above, or as an alternative to any of the foregoing embodiments, the second face of the tip wall and second ends of the leading edge wall, the trailing edge wall, the pressure side wall, and the suction side wall define a pocket.

According to yet another embodiment of the present disclosure, a gas turbine engine is provided. The gas turbine engine includes a fan section and a fan blade. The fan section has a fan case disposed about a fan. The fan case has a rub strip disposed on an inner surface of the fan case. The fan blade is incorporated into a rotor provided with the fan section. The fan blade includes a blade body and a tip assembly. The blade body has a tip that is disposed proximate the rub strip. The tip assembly has a first end that is operatively connected to the blade body and a second end that is disposed opposite the first end and extending towards the rub strip.

In addition to one or more of the features described above, or as an alternative to any of the foregoing embodiments, the tip assembly has a leading edge wall, a trailing edge wall disposed opposite the leading edge wall, a suction side wall, and a pressure side wall each extending radially between the first end and the second end of the tip assembly, and a tip wall, defining a plurality of holes, extending between the leading edge wall, the trailing edge, suction side wall, and the pressure side wall.

In addition to one or more of the features described above, or as an alternative to any of the foregoing embodiments, the second end of the tip assembly and the tip wall define a pocket.

In addition to one or more of the features described above, or as an alternative to any of the foregoing embodiments, the first end of the tip assembly and the tip wall define a receiving region that receives a portion of the blade body.

In addition to one or more of the features described above, or as an alternative to any of the foregoing embodiments, the tip engages the tip wall.

BRIEF DESCRIPTION OF THE DRAWINGS

The following descriptions should not be considered limiting in any way. With reference to the accompanying drawings, like elements are numbered alike.

DETAILED DESCRIPTION

A detailed description of one or more embodiments of the disclosed apparatus and method are presented herein by way of exemplification and not limitation with reference to the Figures.

Figure 1:
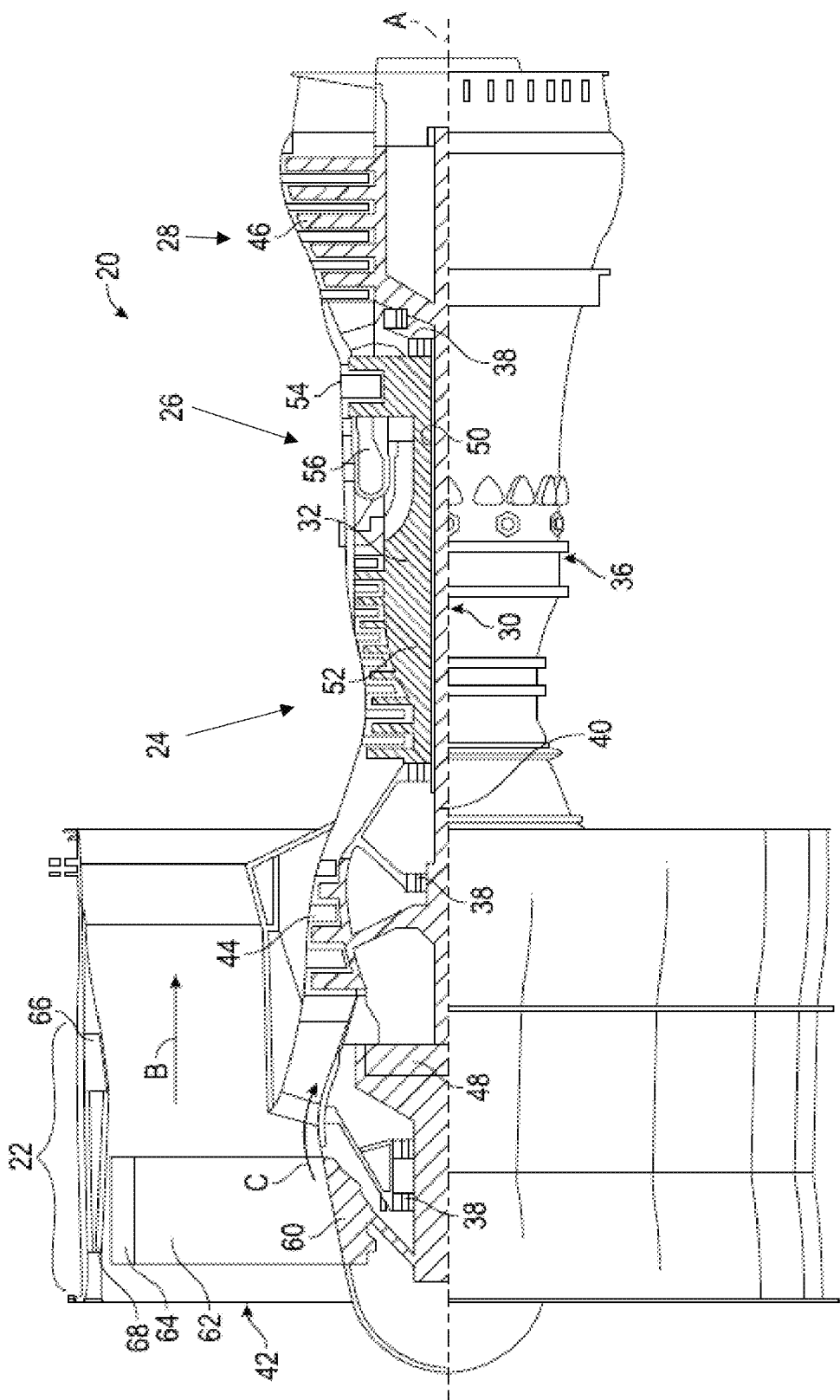
FIG. 1 is a schematic representation of a gas turbine engine provided with a fan blade having a tip assembly.

FIG. 1 schematically illustrates a gas turbine engine 20. The gas turbine engine 20 is disclosed herein as a two-spool turbofan that generally incorporates a fan section 22, a compressor section 24, a combustor section 26 and a turbine section 28. Alternative engines might include an augmentor section (not shown) among other systems or features.

The fan section 22 drives air along a bypass flow path B in a bypass duct, while the compressor section 24 drives air along a core flow path C for compression and communication into the combustor section 26 then expansion through the turbine section 28. Although depicted as a two-spool turbofan gas turbine engine in the disclosed non-limiting embodiment, it should be understood that the concepts described herein are not limited to use with two-spool turbofans as the teachings may be applied to other types of turbine engines including three-spool architectures.

The gas turbine engine 20 generally includes a low speed spool 30 and a high speed spool 32 mounted for rotation about an engine central longitudinal axis A relative to an engine static structure 36 via several bearing systems 38. It should be understood that various bearing systems 38 at various locations may alternatively or additionally be provided and the location of bearing systems 38 may be varied as appropriate to the application.

The low speed spool 30 generally includes an inner shaft 40 that interconnects a fan 42, a low pressure compressor 44 and a low pressure turbine 46. The inner shaft 40 is connected to the fan 42 through a speed change mechanism, which in gas turbine engine 20 is illustrated as a geared architecture 48 to drive the fan 42 at a lower speed than the low speed spool 30. The high speed spool 32 includes an outer shaft 50 that interconnects a high pressure compressor 52 and high pressure turbine 54.

A combustor 56 of the combustor section 26 is arranged in the gas turbine engine 20. The combustor 56 is arranged between the high pressure compressor 52 and the high pressure turbine 54. An engine static structure 36 is arranged generally between the high pressure turbine 54 and the low pressure turbine 46. The engine static structure 36 further supports bearing systems 38 in the turbine section 28.

The inner shaft 40 and the outer shaft 50 are concentric and rotate via bearing systems 38 about the engine central longitudinal axis A which is collinear with their longitudinal axes.

The core airflow is compressed by the low pressure compressor 44 then the high pressure compressor 52, mixed and burned with fuel in the combustor 56, then expanded over the high pressure turbine 54 and low pressure turbine 46. The turbines 46, 54 rotationally drive the respective low speed spool 30 and high speed spool 32 in response to the expansion. It will be appreciated that each of the positions of the fan section 22, compressor section 24, combustor section 26, turbine section 28, and fan drive gear system 48 may be varied. For example, gear system 48 may be located aft of combustor section 26 or even aft of turbine section 28, and fan section 22 may be positioned forward or aft of the location of gear system 48.

Although the gas turbine engine 20 is depicted as a turbofan, it should be understood that the concepts described herein are not limited to use with the described configuration, as the teachings may be applied to other types of engines such as, but not limited to, turbojets, turboshafts, and three-spool (plus fan) turbofans wherein an intermediate spool includes an intermediate pressure compressor ("IPC") between a low pressure compressor ("LPC") and a high pressure compressor ("HPC"), and an intermediate pressure turbine ("IPT") between the high pressure turbine ("HPT") and the low pressure turbine ("LPT").

The fan 42 includes a fan hub or a fan rotor 60 that carries a fan blade 62 having a tip assembly 64. A fan case 66 is disposed about the fan 42. The fan case 66 includes a rub strip 68 that is disposed on an inner surface of the fan case 66. The fan blade 62 having a tip assembly 64 radially extends from and is incorporated into the fan rotor 60. As used in the present disclosure, the radial direction is a direction that is disposed substantially perpendicular to the engine central longitudinal axis A. Furthermore, as used in the present disclosure, the axial direction is direction that is disposed substantially parallel to the engine central longitudinal axis A.

Figure 2:
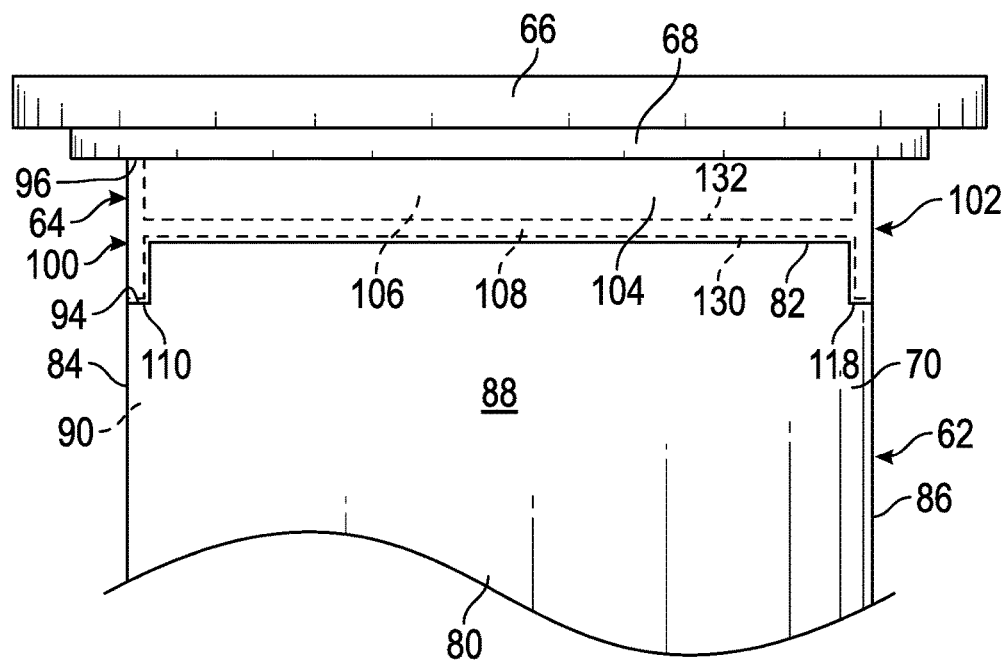
FIG. 2 is a partial cross-sectional view of the fan blade having the tip assembly disposed proximate a rub strip of a fan case.

The fan blade 62 may be made of a lightweight composite such as a fiber composite material. Referring to FIG. 2, the fan blade 62 includes a blade body 70. The blade body 70 includes a root 80, a tip 82, a leading edge 84, a trailing edge 86, a pressure side 88, and a suction side 90. The root 80 is disposed proximate the fan rotor 60. The tip 82 is radially spaced apart from the root 80 and is disposed proximate the rub strip 68 that is disposed on the inner surface of the fan case 66. The leading edge 84 is spaced apart from and is disposed opposite the trailing edge 86. The pressure side 88 and the suction side 90 each radially extend from the root 80 to the tip 82. The pressure side 88 and the suction side 90 each axially exceed and between the leading edge 84 and the trailing edge 86. The pressure side 88 and the suction side 90 each connect the leading edge 84 to the trailing edge 86. The root 80 extends between proximal ends of the leading edge 84, the trailing edge 86, the pressure side 88, and the suction side 90. The tip 82 extends between distal ends of the leading edge 84, the trailing edge 86, the pressure side 88, and the suction side 90.

The tip assembly 64 is disposed between the rub strip 68 that is disposed on the inner surface of the fan case 66 and the tip 82 of the blade body 70 of the fan blade 62. The tip assembly 64 has a first end 94 and a second end 96. The first end 94 of the tip assembly 64 is operatively connected to the blade body 70 proximate the tip 82. The second end 96 of the tip assembly 64 is disposed opposite the first end 94 and extends towards the rub strip 68. In at least one embodiment, the second end 96 is configured to engage the rub strip 68.

Figure 3:
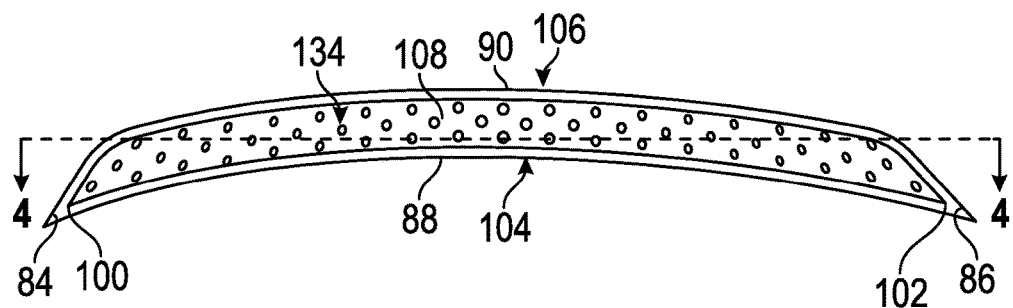
FIG. 3 is a top view of the fan blade having the tip assembly.
Figure 4:
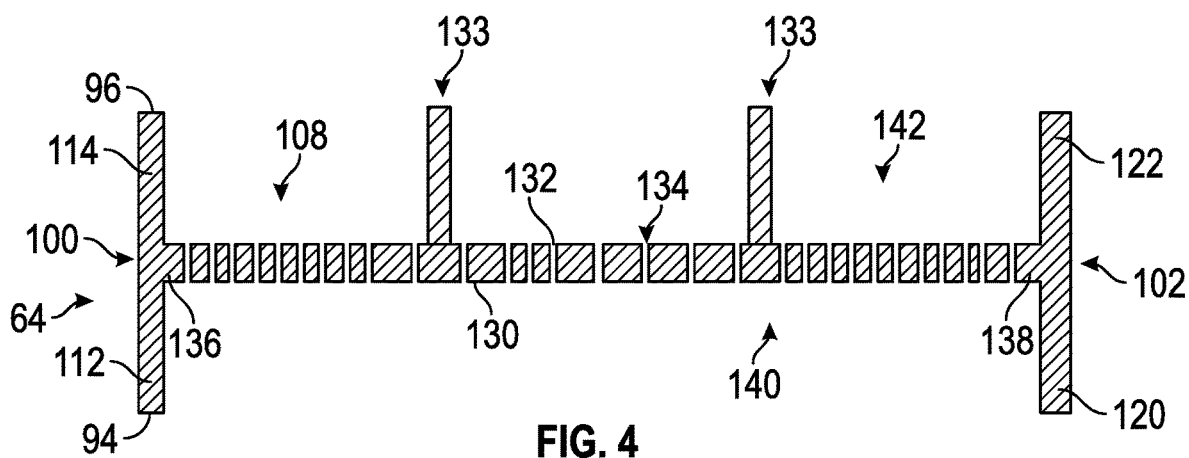
FIG. 4 is a cross-sectional view of the fan blade having the tip assembly.

The tip assembly 64 may be made of a metallic material. Referring to FIGS. 2-4, the tip assembly 64 includes a leading edge wall 100, a trailing edge wall 102, a pressure side wall 104, a suction side wall 106, and a tip wall 108.

The leading edge wall 100 is disposed proximate the leading edge 84. The leading edge wall 100 may smoothly transition from the leading edge 84 of the blade body 70 such that the leading edge wall 100 is disposed substantially parallel to the leading edge 84. In at least one embodiment, a leading edge notch 110 may be formed in the blade body 70 and may extend between the leading edge 84 and the tip 82 of the blade body 70.

The leading edge wall 100 radially extends between the first end 94 and the second end 96 of the tip assembly 64. The leading edge wall 100 defines a leading edge wall first end 112 and a leading edge wall second end 114. The leading edge wall first end 112 engages the leading edge 84. The leading edge wall second end 114 is spaced apart from the leading edge 84 and is disposed proximate the rub strip 68.

The trailing edge wall 102 is disposed proximate the trailing edge 86. The trailing edge wall 102 is disposed substantially parallel to the leading edge wall 100. The trailing edge wall 102 may smoothly transition from the trailing edge 86 of the blade body 70 such that the trailing edge wall 102 is disposed substantially parallel to the trailing edge 86. In at least one embodiment, a trailing edge notch 118 may be formed and the blade body 70 and may extend between the trailing edge 86 and the tip 82 of the blade body 70.

The trailing edge wall 102 radially extends between the first end 94 and the second end 96 of the tip assembly 64. The trailing edge wall 102 defines a trailing edge wall first end 120 and a trailing edge wall second end 122. The trailing edge wall first end 120 engages the trailing edge 86. The trailing edge wall second end 122 is spaced apart from the trailing edge 86 is disposed proximate the rub strip 68.

The pressure side wall 104 and the suction side wall 106 each extend radially between the first end 94 and the second end 96 of the tip assembly 64. The pressure side wall 104 and the suction side wall 106 each extend axially between the leading edge wall 100 and the trailing edge wall 102. In at least one embodiment, a junction between the pressure side wall 104 and the suction side wall 106 proximate the leading edge 84 of the blade body 70 defines the leading edge wall 100. In at least one embodiment, a junction between the pressure side wall 104 and the suction side wall 106 proximate the trailing edge 86 of the blade body 70 defines the trailing edge wall 102.

An abradable or an erosion coating may be disposed about the tip assembly 64. The erosion coating may be disposed proximate the first end 94.

The tip wall 108 extends between the leading edge wall 100, the trailing edge wall 102, the pressure side wall 104, and the suction side wall 106. The tip wall 108 is disposed substantially parallel to the tip 82. The tip wall 108 engages and/or is disposed on the tip 82 of the blade body 70. The tip wall 108 is bonded to the tip 82 of the blade body 70.

The tip wall 108 includes a first face 130 and a second face 132 each extending axially between the leading edge wall 100 and the trailing edge wall 102. The first face 130 is configured to engage the tip 82 of the blade body 70. The second face 132 is disposed opposite the first face 130 and faces towards the rub strip 68.

In at least one embodiment, at least one protrusion 133 may extend from the second face 132 of the tip wall 108 towards the second end 96 of the tip assembly 64. The protrusion 133 may have various geometric configurations such as a finger, a rounded perturbation, or the like. The protrusion 133 may be disposed substantially perpendicular to the second face 132 of the tip wall 108. A plurality of protrusions may be axially spaced apart from each other and may be disposed substantially parallel to the leading edge wall 100 and trailing edge wall 102.

The tip wall 108 defines a plurality of holes 134 that extend from the first face 130 towards the second face 132. The plurality of holes 134 extend completely through the tip wall 108. The plurality of holes 134 are offset from the at least one protrusion 133. The plurality of holes 134 are configured to provide a visual indicator of the complete bond line between the tip wall 108 and the tip 82 of the blade body 70. For example, should an adhesive be applied to bond the tip wall 108 of the tip assembly 64 to the tip 82 of the blade body 70, the adhesive may protrude through a substantial portion of the plurality of holes 134 to ensure that sufficient adhesive has been applied or that sufficient bonding has occurred.

The tip wall 108 includes a first portion 136 and the second portion 138. The first portion 136 operatively connected to the leading edge wall 100. The first portion 136 is disposed between and is spaced apart from the leading edge wall first end 112 (the first end 94 of the tip assembly 64) and the leading edge wall second end 114 (the second end 96 of the tip assembly 64). The second portion 138 is operatively connected to the trailing edge wall 102. The second portion 138 is disposed between and spaced apart from the trailing edge wall first end 120 (the first end 94 of the tip assembly 64) and the trailing edge wall second end 122 (the second end 96 of the tip assembly 64).

The leading edge wall first end 112, the trailing edge wall first end 120, a portion of the pressure side wall 104, a portion of suction side wall 106, and the first face 130 of the tip wall 108 define a receiving region 140. In other words, the tip assembly 64 defines a receiving region 140 that extends from the first end 94 towards the tip wall 108. The receiving region 140 receives a portion of the blade body 70 disposed proximate the tip 82 of the blade body 70. For example, the receiving region 140 is configured to receive the tip 82, the leading edge 84, the trailing edge 86, the pressure side 88, and the suction side 90 of the blade body 70 of the fan blade 62.

The leading edge wall second end 114, the trailing edge wall second end 122, a portion of the pressure side wall 104, a portion of the suction side wall 106, and the second face 132 of the tip wall 108 define a pocket 142. In other words, the tip assembly 64 defines a pocket 142 that extends from the second end 96 towards the tip wall 108. The pocket 142 may establish an air pocket that provides an area of insulation for the composite fan blade 42 and the abradable coating from heat that may be generated during rubbing between the second end 96 of the tip assembly 64 and the rub strip 68.

In some embodiments, the at least one protrusion 133 may subdivide the pocket 142 into at least two pockets. The at least two pockets may establish multiple air pockets to provide multiple areas of insulation.

During operation of the gas turbine engine 20, radial growth of at least one of the fan blade 62 and the tip assembly 64 may occur due to the fan 42 rotate in about the central engine longitudinal axis A. The radial growth may cause the second end 96 of the tip assembly 64 to engage and rub into the rub strip 68.

The term "about" is intended to include the degree of error associated with measurement of the particular quantity based upon the equipment available at the time of filing the application. For example, "about" can include a range of ±8% or 5%, or 2% of a given value.

The terminology used herein is for the purpose of describing particular embodiments only and is not intended to be limiting of the present disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, element components, and/or groups thereof.

While the present disclosure has been described with reference to an exemplary embodiment or embodiments, it will be understood by those skilled in the art that various changes may be made and equivalents may be substituted for elements thereof without departing from the scope of the present disclosure. In addition, many modifications may be made to adapt a particular situation or material to the teachings of the present disclosure without departing from the essential scope thereof. Therefore, it is intended that the present disclosure not be limited to the particular embodiment disclosed as the best mode contemplated for carrying out this present disclosure, but that the present disclosure will include all embodiments falling within the scope of the claims.

What is claimed is:

1. A fan blade for a gas turbine engine, comprising:
   a blade body having a pressure side disposed opposite a suction side, each of the pressure side and the suction side extending radially from a root towards a tip and extending axially from a leading edge towards a trailing edge; and
   a tip assembly disposed on the tip, the tip assembly having:
      a leading edge wall disposed proximate the leading edge, a trailing edge wall disposed proximate the trailing edge, and a tip wall extending between the leading edge wall and the trailing edge and disposed parallel to the tip, the tip assembly affixed to the blade body at a first radial end of the tip assembly and the tip assembly defining a pocket in the tip assembly at a second radial end of the tip assembly opposite the first radial end; and
      one or more protrusions extending from the tip wall into the pocket;
   the blade body including a notch formed at at least one of the leading edge or the trailing edge, the tip assembly radially overlapping the blade body at the notch.

2. The fan blade of claim 1, wherein the leading edge wall extends radially between a leading edge wall first end that engages the leading edge and a leading edge wall second end that is spaced apart from the leading edge.

3. The fan blade of claim 2, wherein the trailing edge wall extends radially between a trailing edge wall first end that engages the trailing edge and a trailing edge wall second end that is spaced apart from the trailing edge.

4. The fan blade of claim 3, wherein the leading edge wall second end, the trailing edge wall second end, and the tip wall at least partially define the pocket.

5. The fan blade of claim 3, wherein the tip wall has a first portion that is operatively connected to the leading edge wall and a second portion that is operatively connected to the trailing edge wall.

6. The fan blade of claim 5, wherein the first portion is disposed between and is spaced apart from the leading edge wall first end and the leading edge wall second end.

7. The fan blade of claim 5, wherein the second portion is disposed between the trailing edge wall first end and the trailing edge wall second end.

8. The fan blade of claim 5, wherein the tip assembly is bonded to the tip of the blade body.

9. A fan blade provided with a gas turbine engine, comprising:
   a tip assembly disposed on a blade body, the tip assembly having a leading edge wall disposed proximate a leading edge of the blade body, a trailing edge wall disposed proximate a trailing edge of the blade body, a suction side wall extending between the leading edge wall and the trailing edge wall, a pressure side wall disposed opposite the suction side wall and extending between the leading edge wall and the trailing edge wall, and a tip wall extending between the leading edge wall, the trailing edge wall, the suction side wall, and the pressure side wall and is disposed parallel to the tip, the tip assembly affixed to the blade body at a first radial end of the tip assembly and the tip assembly defining a pocket in the tip assembly at a second radial end of the tip assembly opposite the first radial end; and
   one or more protrusions extending from the tip wall into the pocket;
   the blade body including a notch formed at at least one of the leading edge or the trailing edge, the tip assembly radially overlapping the blade body at the notch.

10. The fan blade of claim 9, wherein the tip wall includes a first face and a second face disposed opposite the first face.

11. The fan blade of claim 10, wherein the tip wall defines a plurality of holes that extend from the first face to the second face.

12. The fan blade of claim 11, wherein the first face engages a tip of the blade body.

13. The fan blade of claim 11, wherein the tip wall is bonded to a tip of the blade body.

14. The fan blade of claim 11, wherein the first face of the tip wall and first ends of the leading edge wall, the trailing edge wall, the pressure side wall, and the suction side wall define a receiving region that receives the tip of the blade body.

15. The fan blade of claim 14, wherein the second face of the tip wall and second ends of the leading edge wall, the trailing edge wall, the pressure side wall, and the suction side wall define the pocket.

16. A gas turbine engine, comprising:
   a fan section having a fan case disposed about a fan, the fan case having a rub strip disposed on an inner surface of the fan case; and
   a fan blade incorporated into a rotor provided with the fan section, the fan blade comprising:
      a blade body having a tip that is disposed proximate the rub strip, and
      a tip assembly having a first end operatively connected to the blade body and a second end disposed opposite the first end and extending towards the rub strip, the tip assembly affixed to the blade body at a first radial end of the tip assembly and the tip assembly defining a pocket in the tip assembly at a second radial end of the tip assembly opposite the first radial end; and
      one or more protrusions extending from the tip wall into the pocket;
      the blade body including a notch formed at at least one of the leading edge or the trailing edge, the tip assembly radially overlapping the blade body at the notch.

17. The gas turbine engine of claim 16, wherein the tip assembly has a leading edge wall, a trailing edge wall disposed opposite the leading edge wall, a suction side wall, and a pressure side wall each extending radially between the first end and the second end of the tip assembly, and a tip wall, defining a plurality of holes, extending between the leading edge wall, the trailing edge, suction side wall, and the pressure side wall.

18. The gas turbine engine of claim 17, wherein the second end of the tip assembly and the tip wall define the pocket.

19. The gas turbine engine of claim 18, wherein the first end of the tip assembly and the tip wall define a receiving region that receives a portion of the blade body.

20. The gas turbine engine of claim 19, wherein the tip engages the tip wall.

\* \* \* \* \*